J. H. CLUNE.
PNEUMATIC TIRE.
APPLICATION FILED DEC. 9, 1910.
1,036,455.
Patented Aug. 20, 1912.
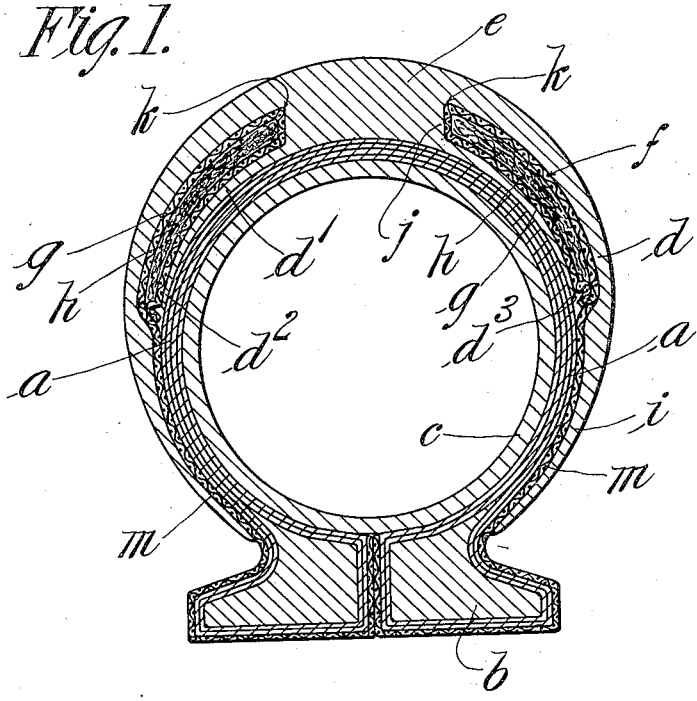
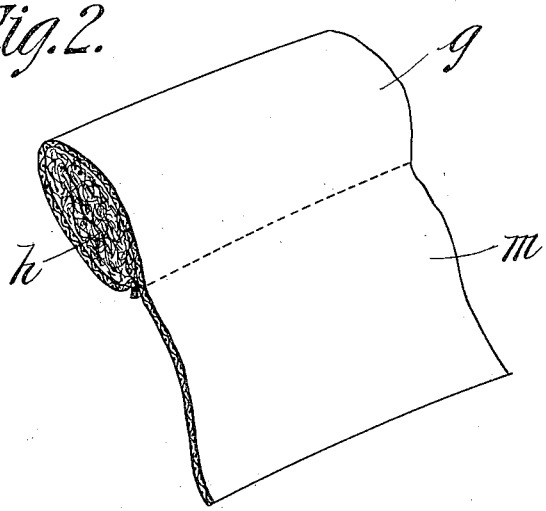
WITNESSES:
INVENTOR,
John H. Clune
BY
ATTORNEY.

UNITED STATES PATENT OFFICE.

JOHN H. CLUNE, OF SPRINGFIELD, MASSACHUSETTS.

PNEUMATIC TIRE.

1,036,455.  Specification of Letters Patent.  Patented Aug. 20, 1912.

Application filed December 9, 1910. Serial No. 596,433.

*To all whom it may concern:*

Be it known that I, JOHN H. CLUNE, a citizen of the United States of America, residing at Springfield, in the county of Hampden and State of Massachusetts, have invented new and useful Improvements in Pneumatic Tires, of which the following is a specification.

This invention relates to improvements in pneumatic tires and the objects of the invention are to produce a structure that is practically puncture proof and to form the tread portion of the tire so that it will prevent the skidding or sliding to a large extent of the motor vehicle on which the tires are used; to lessen the liability of blow-outs which are caused largely by the heat that is generated when the tire is in use and which is conducted through the rubber tread and from that portion to the body portion of the tire causing a weakness of the same so that the tire breaks down or blows out, as it is termed.

A further object of the invention is in the employment of a large amount of canvas or cloth which is used to incase the fibrous material which is located near the tread or side portion of the tire.

With these objects in view, the invention consists broadly in a thickened tread portion made of rubber, the lateral sides of which are provided with cavities in which is located a continuous sack filled with fibrous material. It has been found from experience that a large percentage of the blow-outs and punctures of pneumatic tires occur on the side portions of tires and not on the tread portions, and therefore any strengthening or improvement in tire constructions which will prevent the blow-outs and punctures in the side portions of the tire will lengthen the durability of the tire.

In the drawings forming part of this application,—Figure 1 is a transverse sectional view of the tire clearly illustrating the construction of the tread portion, the body part of the tire, and the inner tube. Fig. 2 is a detailed, sectional view of the canvas sacks for inclosing the fibrous material and the depending portion which extends to the base portion of the tire.

Referring to the drawings in detail, $a$ designates the body portion of the tire; $b$ the base portion of any suitable type; $c$ the inner tube; $d$ the tread portion, the center part of which is thickened, as shown at $e$.

Arranged in the lateral portions of the tread $d$ are annular cavities $f$ in which are located sacks or tubular elements $g$ containing a fibrous material $h$ which, preferably, consists of raw flax in a matted or uncombed condition. These tubular elements, as shown in Fig. 2, after being filled with the fibrous material, are then flattened so as to be inserted in the annular cavities $f$, as clearly illustrated in Fig. 1. It will be understood that these tubular elements $g$ are made of canvas or some cloth material which has been previously saturated with a rubber compound so that when the tubes, tread portion, and body portion $a$ are vulcanized, the whole mass will be securely united together.

It will be noticed that the tread portion $d$, extends, as at $i$, toward the attaching base part of the tire, and is made thin and tapering in shape, while the thickened part $e$ is very heavy.

The upper end of the annular cavities $f$, as indicated at $j$, is made parallel with the plane passing through the center portion of the tire. The purpose of this construction is to form the wide portion of the annular cavities $f$ in which the tubular elements $g$, are placed so that when any pressure occurs at the point $k$, a shoulder or ridge is formed in the tread portion of the tire caused by the compression of the matted or fibrous material $h$ which, in turn, would prevent skidding to a large extent. The tread portion $d$ is further provided with an annular lip part $d^1$ which is situated between the annular cavities $f$ and the body part $a$, its inner end $d^2$ being spaced from the part $i$ whereby an opening $d^3$ is provided for the insertion of the tubes $g$ in the annular cavities $f$ before the tread portion $d$ is put in place for vulcanization.

By reason of the matted fibrous material $h$, punctures are less liable to occur because it has been found in practice that nails and other pointed articles which ordinarily pierce the tread portion of a tire can not pass through the matted material $h$.

The canvas material which comprises the tubular elements $g$ has a depending portion $m$ which is carried down onto the base portion $b$, as shown, so that the tread $d$ is securely attached to the body *a* in the finished article.

On account of the interposition of the canvas material *m* which forms the inclosing casing of the tubular elements *g* a large amount of heat is prevented from reaching the body portion *a* of the tire as it is well known that canvas or cloth is a very poor conductor of heat, the strength of the body portion of the tire is therefore greatly prolonged, thus lessening the chance of blow-outs or a break-down occurring in the tire.

What I claim, is:—

1. A tire comprising a body portion, a tread portion secured thereto, the tread portion having at each side a pair of laterally arranged lips forming a cavity between the same, tubular elements filled with fibrous material and located within the cavities, the tubular elements having depending portions which are carried partly around the body portion and into engagement with the base part of the tire, whereby the tread portion and the tubular elements are secured to the body portion after vulcanization.

2. A tire construction comprising a body portion, a tread portion having a solid thickened part which engages the roadway when in use, annular cavities formed in the sides of the tread portion and spaced from the thickened portion, tubular elements located within the cavity and filled with fibrous material, whereby when the tire is in use the portion of the tread portion in which the tubular elements are located will be compressed more than the solid part of the tread portion, whereby skidding or sliding will be prevented.

JOHN H. CLUNE.

Witnesses:
K. I. CLEMONS,
HARRY W. BOWEN.

---

Copies of this patent may be obtained for five cents each, by addressing the "Commissioner of Patents, Washington, D. C."